(12) United States Patent
Elsharqawy et al.

(10) Patent No.: US 8,465,006 B2
(45) Date of Patent: Jun. 18, 2013

(54) SEPARATION OF A VAPORIZABLE COMPONENT UNDER REDUCED PRESSURE

(71) Applicants: Massachusetts Institute of Technology, Cambridge, MA (US); King Fahd University of Petroleum and Minerals, Dhahran (SA)

(72) Inventors: Mostafa H. Elsharqawy, Dhahran (SA); John H. Lienhard, Lexington, MA (US); Syed M. Zubair, Dhahran (SA); Prakash N. Govindan, Cambridge, MA (US)

(73) Assignees: Massachusetts Institute of Technology, Cambridge, MA (US); King Fahd Univeristy of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/624,143

(22) Filed: Sep. 21, 2012

(65) Prior Publication Data
US 2013/0015051 A1    Jan. 17, 2013

Related U.S. Application Data

(63) Continuation of application No. 12/554,726, filed on Sep. 4, 2009, now Pat. No. 8,292,272.

(51) Int. Cl.
*B01F 3/04*    (2006.01)
(52) U.S. Cl.
USPC ............... 261/117; 95/211; 95/227; 95/228; 96/290; 96/294
(58) Field of Classification Search
USPC ............... 95/211, 227, 228; 261/117; 96/290, 96/294; 203/10, 11, DIG. 17
See application file for complete search history.

(56) References Cited

U.S. PATENT DOCUMENTS

| 2,444,527 A | 7/1948 | Pomeroy |
| 3,214,351 A | 10/1965 | Lichtenstein et al. |

(Continued)

FOREIGN PATENT DOCUMENTS

| EP | 1443025 A1 | 8/2004 |
| FR | 2281896 | 3/1976 |

(Continued)

OTHER PUBLICATIONS

Muller-Holst, Hendrik, "Solar Thermal Desalination Using the Multiple Effect Humidification (MEH) Method", Solar Desalination for the 21st Century, 215-222 (2007).

(Continued)

*Primary Examiner* — Robert A Hopkins
(74) *Attorney, Agent, or Firm* — Modern Times Legal; Robert J. Sayre (57) ABSTRACT

The productivity of a combined heat and mass transfer device is improved by directing a flow of a carrier-gas mixture through a fluid flow path in a combined heat and mass transfer device operating at a pressure below atmospheric pressure. Heat and mass are transferred from or to the carrier-gas mixture by a direct or indirect interaction with a liquid composition that includes a vaporizable component (e.g., water) in a liquid state to substantially change the content of the vaporizable component in the carrier-gas mixture via evaporation of the vaporizable component from the liquid composition or via condensation of the vaporizable component from the carrier-gas mixture, producing a flow of carrier-gas mixture having a concentration of the vaporizable component that differs from the concentration of the vaporizable component in the carrier-gas mixture before the heat and mass transfer process.

19 Claims, 6 Drawing Sheets

U.S. PATENT DOCUMENTS

| | | |
|---|---|---|
| 3,367,787 A | 2/1968 | Thijssen et al. |
| 3,376,165 A | 4/1968 | Abbott |
| 3,558,436 A | 1/1971 | Foley et al. |
| 3,860,492 A | 1/1975 | Lowi, Jr. et al. |
| 4,363,703 A | 12/1982 | ElDifrawi et al. |
| 4,595,459 A | 6/1986 | Kusakawa et al. |
| 5,168,728 A | 12/1992 | Djelouah et al. |
| 6,607,639 B1 | 8/2003 | Longer |
| 7,225,620 B2 | 6/2007 | Klausner et al. |
| 7,381,310 B2 | 6/2008 | Hernandez Hernandez et al. |
| 7,431,805 B2 | 10/2008 | Beckman |
| 7,431,806 B2 | 10/2008 | Levine |
| 7,757,475 B2 * | 7/2010 | Sasaki et al. .............. 60/39.5 |
| 8,252,092 B2 | 8/2012 | Govindan et al. |
| 8,292,272 B2 | 10/2012 | Elsharqawy et al. |
| 2002/0166758 A1 | 11/2002 | Vinz |
| 2005/0121304 A1 | 6/2005 | Beckman |

FOREIGN PATENT DOCUMENTS

| | | |
|---|---|---|
| FR | 2713219 A1 | 6/1995 |
| WO | WO-2004/067451 A1 | 8/2004 |

OTHER PUBLICATIONS

Vlachlogiannis, M., et al., "Desalination by Mechanical Compression of Humid Air", 122 Desalination, 35-42 (1999).

Nawayseh, Naser KH., et al., "Solar desalination based on humidification process—I. Evaluating the heat and mass transfer coefficients", Energy Conversion & Management, vol. 40, Issue 13, 1423-1439 (Sep. 1999).

Nawayseh, Naser KH., et al., "Solar desalination based on humidification process—II. Computer simulation", Energy Conversion & Management, vol. 40, Issue 13, 1441-1461 (Sep. 1999).

European Patent Office, "International Search Report and Written Opinion, Application No. PCT/US2010/047598" (Nov. 22, 2010).

* cited by examiner

SEPARATION OF A VAPORIZABLE COMPONENT UNDER REDUCED PRESSURE

RELATED APPLICATION

This application is a continuation of U.S. application Ser. No. 12/554,726, filed 4 Sep. 2009 now U.S. Pat. No. 8,292,272, the entire contents of which are incorporated herein by reference.

BACKGROUND

Desalination of seawater or brackish water is generally performed by either of the following two main processes: (a) by evaporation of water vapor or (b) by use of a semi-permeable membrane to separate fresh water from a concentrate. In a phase-change or thermal processes, the distillation of seawater is achieved by utilizing a heat source. In the membrane processes, electricity is used either for driving high-pressure pumps or for establishing electric fields to separate the ions.

Important commercial desalination processes based on thermal energy are multistage flash (MSF), multiple-effect distillation (MED) and thermal vapor compression (TVC). The MSF and MED processes consist of many serial stages at successively decreasing temperature and pressure.

The multistage flash process is based on the generation of vapor from seawater or brine due to a sudden pressure reduction (flashing) when seawater enters an evacuated chamber. The process is repeated stage-by-stage at successively decreasing pressures. Condensation of vapor is accomplished by regenerative heating of the feed water. This process requires an external steam supply, normally at a temperature around 100° C. The maximum operating temperature is limited by scaling formation, and thus the thermodynamic performance of the process is also limited.

For the multiple-effect distillation system, water vapor is generated by heating the seawater at a given pressure in each of a series of cascading chambers. The steam generated in one stage, or "effect," is used to heat the brine in the next stage, which is at a lower pressure.

The thermal performance of these systems is proportional to the number of stages, with capital cost limiting the number of stages to be used.

In thermal vapor compression systems, after water vapor is generated from the saline solution, the water vapor is thermally compressed using a high pressure steam supply and then condensed to generate potable water.

A second important class of industrial desalination processes uses membrane technologies, principally reverse osmosis (RO) and electrodialysis (ED). Reverse osmosis employs power to drive a pump that increases the pressure of the feed water to the desired value. The required pressure depends on the salt concentration of the feed. The pumps are normally electrically driven. For reverse osmosis systems, which are currently the most economical desalination systems, the cost of water production can go up to US$3/m³ for plants of smaller capacity (e.g., 5 to 100 m³/day). Also, reverse osmosis plants require expert labor for operation and maintenance purposes. The electrodialysis process also requires electricity to produce migration of ions through suitable ion-exchange membranes. Both reverse osmosis and electrodialysis are useful for brackish water desalination; reverse osmosis, however, is also competitive with multistage flash distillation processes for large-scale seawater desalination. The multistage flash process represents more than 75% of the thermal desalination processes, while the reverse osmosis process represents more than 90% of membrane processes for water production. Multistage flash plants typically have capacities ranging from 100,000 to almost 1,000,000 m³/day. The largest reverse osmosis plant currently in operation is the Ashkelon plant, at 330,000 m³/day.

Other approaches to desalination include processes such as the ion-exchange process, liquid-liquid extraction, and the gas hydrate process. Most of these approaches are not widely used except when there is a requirement to produce high purity (total dissolved solids <10 ppm) water for specialized applications.

Another interesting process that has garnered much attention recently is the forward osmosis process. In this process, a carrier solution is used to create a higher osmotic pressure than that of seawater. As a result the water in seawater flows through the membrane to the carrier solution by osmosis. This water is then separated from the diluted carrier solution to produce pure water and a concentrated solution that is sent back to the osmosis cell. This technology is yet to be proven commercially.

The technology that is at the root of this invention is known as the humidification-dehumidification (HDH). The HDH process involves the evaporation of water from a heated water source (e.g., sea water) in a humidifier, where the evaporated water humidifies a carrier gas. The humidified carrier gas is then passed to a dehumidifier, where the water is condensed out of the carrier gas.

The predecessor of the HDH cycle is the simple solar still. In the solar still, water contained in an enclosure is heated by sunlight to cause evaporation, and the evaporated water is condensed on a glass cover of the enclosure and collected. The most prohibitive drawback of a solar still is its low efficiency (generally producing a gained-output-ratio less than 0.5). The low efficiency of the solar still is primarily the result of the immediate loss of the latent heat of condensation through the glass cover of the still. Some designs recover and reuse the heat of condensation, increasing the efficiency of the still. These designs (called multi-effect stills) achieve some increase in the efficiency of the still, but the overall performance is still relatively low. The main drawback of the solar still is that the various functional processes (solar absorption, evaporation, condensation, and heat recovery) all occur within a single component.

SUMMARY

The apparatus and methods, described herein, include improvements upon the humidification-dehumidification process for separating water. Various embodiments of this invention, as characterized in the claims, may include some or all of the apparatus, methods, elements, features and steps described below.

A method for separating water from a liquid mixture that includes water uses a humidification chamber and a dehumidification chamber that are each operated at a pressure less than ambient atmospheric pressure. In the method, a carrier gas is flowed through the humidification chamber. Inside the humidification chamber, the carrier gas directly contacts the liquid mixture to humidify the carrier gas with evaporated water from the liquid mixture to produce a humidified gas flow. The humidified gas flow is then directed through the dehumidification chamber, where water is condensed from the humidified gas flow and collected. The total pressure inside both the humidification chamber and the dehumidification chamber is less than ambient atmospheric pressure (for example, at least 10% less than ambient atmospheric pressure—in particular embodiments, about 90 kPa or less).

The humidifier and the dehumidifier are substantially thermally separated from each other (i.e., there is no more than minimal heat transfer via direct thermal conduction between the chambers of each; thermal energy is instead primarily transferred between the chambers via mass flow of the liquid and gas). The carrier gas can be recycled through the apparatus in a closed loop, and the carrier gas and/or the liquid mixture is heated in the apparatus, e.g., by solar energy, waste heat, or fossil fuel. When the gas flow is heated, it can be heated after it leaves the humidification chamber and before it enters the dehumidification chamber. All processes in the apparatus can be powered by renewable energy sources and/or by waste heat; accordingly, some realizations of the apparatus can be operated off-grid (i.e., without any electrical connection to distributed electrical power grid) and in remote areas with few resources. The liquid mixture can be, for example, in the form of sea water, brackish water or ground water.

Desalination technologies based on the apparatus and methods of this disclosure are advantageous in that they have modest energy requirements for operation and can utilize renewable energy (e.g., solar energy, which is the most abundantly available energy resource on the earth, or geothermal or wind energy) or waste heat energy from other processes in remote (off-grid) areas to power the efficient production of substantially pure water. In contrast, conventional processes, such as multistage flash and reverse osmosis require large amounts of energy in the form of thermal energy (for multistage flash) or electric power (for reverse osmosis) and typically are fossil-fuel driven. The use of fossil fuels in conventional approaches results in a large carbon footprint for the desalination plant, and sensitivity to the price and availability of oil. Moreover, owing to their fossil fuel dependence, conventional desalination techniques are less applicable for decentralized water production. Decentralized water production is important for regions that lack the infrastructure and the economic resources to run multistage flash or reverse osmosis plants and that are sufficiently distant from large scale production facilities to render pipeline distribution prohibitive. Many such regions are found in the developing world in regions of high incidence of solar radiation.

Additional advantages that can be achieved with the apparatus and methods, described herein, include (a) an improved gained-output-ratio; (b) low cost for the apparatus and its operation and maintenance; (c) a reduced production of brine disposal due to a lower recovery ratio in comparison with other desalination systems; and (d) excellent suitability for small-scale installations (e.g., producing from 1 to 100 m$^3$ of substantially pure water per day) in, for example, remote desert locations where resources are scarce, though sunlight and salt water are available.

BRIEF DESCRIPTION OF THE DRAWINGS

In the accompanying drawings, like reference characters refer to the same or similar parts throughout the different views. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

The terminology used herein is for the purpose of describing particular embodiments only and is not intended to be limiting of the invention. As used herein, the singular forms "a," "an" and "the" are intended to include the plural forms as well, unless the context clearly indicates otherwise. Additionally, the terms, "includes," "including," "comprises" and "comprising," specify the presence of the stated elements or steps but do not preclude the presence or addition of one or more other elements or steps.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. For example, if a particular composition is referenced, practical, imperfect realities may apply; e.g., the potential presence of at least trace impurities (e.g., at less than 0.1% by weight or volume) can be understood as being within the scope of the description.

Although the terms, first, second, third, etc., may be used herein to describe various elements, these elements should not be limited by these terms. These terms are only used to distinguish one element from another. Thus, a first element, discussed below, could be termed a second element without departing from the teachings of the exemplary embodiments.

In this disclosure, when an element is referred to as being, for example, "on," "connected to" or "coupled to" another element, it may be directly on, connected or coupled to the other element or intervening elements may be present. Additionally, spatially relative terms, such as "above," "upper," "beneath," "below," "lower," and the like, may be used herein for ease of description to describe the relationship of one element to another element, as illustrated in the figures. It will be understood that the spatially relative terms are intended to encompass different orientations of the apparatus in use or operation in addition to the orientation depicted in the figures.

As used herein, gained-output-ratio (GOR) is the ratio of the latent heat of evaporation of the distillate produced to the energy input (e.g., net heat absorbed by one or more solar collectors or the net heat input to the system by other means). The GOR represents the energy efficiency of water production and is an index of the amount of the heat recovery effected in the system.

The humidification-dehumidification (HDH) cycle involves the humidification of a carrier gas by a liquid mixture that contains water followed by the dehumidification of the humidified carrier gas to release pure water.

The separation of the humidification and dehumidification functions into distinct components in a humidification-dehumidification apparatus can reduce thermal inefficiencies and improve overall performance. For example, recovery of the latent heat of condensation in the humidification-dehumidification process is affected in a separate heat exchanger (i.e., the dehumidifier) in which the seawater, for example, can be preheated. Additionally, the module for solar collection can be optimized almost independently of the humidification or condensation component. The humidification-dehumidification process thus can provide higher productivity due to the separation of the basic processes.

Using the apparatus, described below, the principle of humidification-dehumidification of a carrying gas is utilized to separate water from a liquid mixture. The liquid mixture can be in the form of a solution with dissolved components (such as salts) and/or a mixture containing solids and/or other liquids. The process is herein described in the context, for example, of water desalination, where pure water is separated from salt water, though the process and apparatus can likewise be utilized in the context of separating water from other liquid mixtures.

Figure 1:
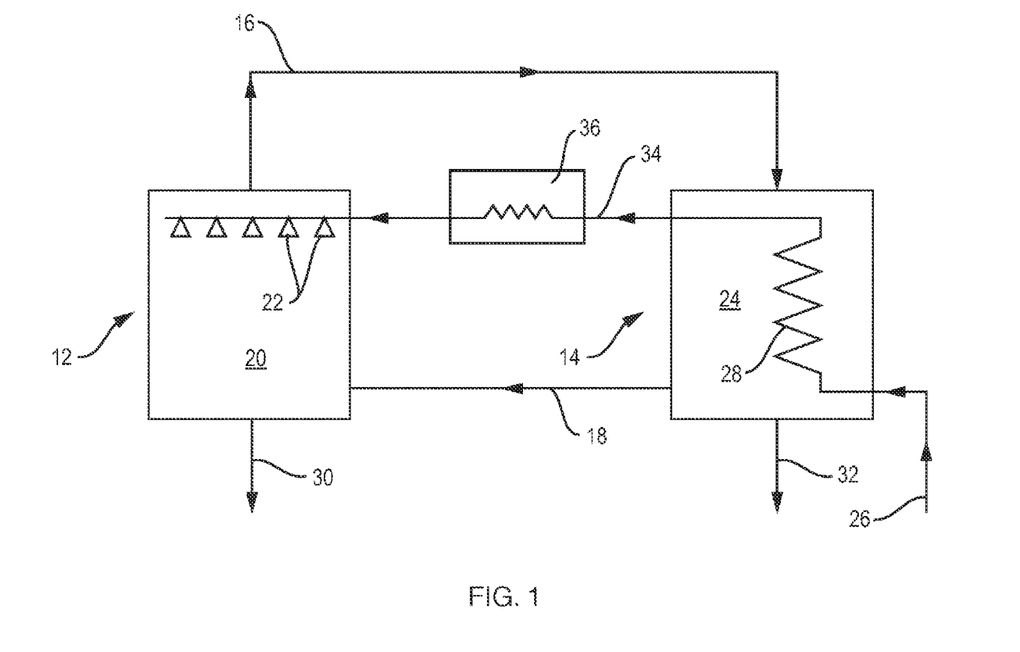
FIG. 1 is a schematic illustration of a humidification-dehumidification cycle and apparatus that utilizes liquid mixture heating.

In a humidification-dehumidification cycle that utilizes liquid mixture heating, as is schematically shown in FIG. 1, a carrying gas (such as air) is circulated through gas conduits 16 and 18 between a humidifier 12 and a dehumidifier 14 in, e.g., a closed loop system. The humidifier 12 and dehumidifier 14 are of a modular construction (i.e., separate parts) and are substantially thermally separated from one another. The characterization of the humidifier and dehumidifier as being "substantially thermally separated" is to be understood as being structured for little or no direct conductive heat transfer through the apparatus between the humidification and dehumidification chambers, though this characterization does not preclude the transfer of thermal energy via gas and/or liquid flow between the chambers. This "substantial thermal separation" characterization thereby distinguishes the apparatus from, e.g., a dewvaporation apparatus, which includes a shared heat-transfer wall between the humidifier and the dehumidifier. In the apparatus of this disclosure, the humidifier and dehumidifier do not share any common walls that would facilitate conductive heat transfer therebetween.

Instead, thermal energy is transferred between the chambers mostly via mass flow of the gas and liquid. The gas is humidified in the humidification chamber 20 of the humidifier 12 using the hot impure water (i.e., the liquid mixture—for example, in the form of an aqueous saline solution), which is sprayed from one or more nozzles 22 at the top of the humidifier 12 while the gas moves in a counter flow direction (up through the humidification chamber 20, as shown), thereby increasing the water vapor content in the gas via evaporation of water from the liquid mixture into the carrier gas flow. The remaining portion of the liquid mixture that is not evaporated in the humidification chamber 20, pools at the bottom of the chamber 20 and drains through a liquid-mixture output conduit 30.

The humidified carrier gas is then directed through conduit 16 to the dehumidifier 14, where the carrier gas is dehumidified in a dehumidification chamber 24 using the cold inlet liquid mixture pumped through a liquid-mixture input conduit 26 and through a coiled conduit 28 inside the dehumidification chamber 24, allowing for heat transfer from the gas to the liquid mixture inside the dehumidifier 14. The water vapor in the gas therefore condenses and is collected as substantially pure water at the bottom of the dehumidification chamber 24. The collected pure water can then be removed from the dehumidifier 14 through pure-water output conduit 32 for use, e.g., as drinking water, for watering crops, for washing/cleaning, for cooking, etc. The carrier gas can be circulated between the humidifier and dehumidifier naturally or by using a fan. If a fan is used for gas circulation, the fan may be powered by a photovoltaic solar panel or by a wind turbine, and the fan may be put in the top gas conduit or in the bottom gas conduit.

After being preliminarily heated in the dehumidifier 14, the liquid mixture is passed via liquid-mixture conduit 34 to the humidifier 12. A heater 36 can be included in or along the conduit 34 to further heat the liquid mixture before entering the humidifier. The heater 36 may use a solar energy source (e.g., the heater may be in the form of a solar collector) and/or may use any waste heat source (e.g., use waste heat generated by other nearby machinery or by a power generating apparatus) to heat the liquid mixture.

In this process, the pressure inside both the humidifier 12 and the dehumidifier 14 is reduced below the ambient atmospheric pressure (i.e., lower than about 101 kPa at sea level), in contrast with previous humidification-dehumidification desalination processes that work under ambient atmospheric pressure. As the pressure inside the humidifier 12 decreases, the ability of the humidified gas to carry more water vapor increases, thereby providing increased production of the pure water when the gas is dehumidified in the dehumidifier 14. This can be explained by the humidity ratio (i.e., the ratio of water vapor mass to dry air mass in moist air), as it is higher at pressures lower than atmospheric pressure. For example, air (as a carrier gas) at a dry bulb temperature of 60° C., the saturation humidity ratio at 50 kPa is roughly 150% higher than at atmospheric pressure.

Our analysis shows that by reducing the operating pressure inside the humidification chamber 20 and inside the dehumidification chamber 24 to a pressure of, for example, 50 kPa, the gained output ratio (GOR) of the process increases. The GOR increases from about 2.4 at standard atmospheric pressure (about 101 kPa) to about 2.55 at about 35 kPa (which is a 6.25% increase).

Figure 2:
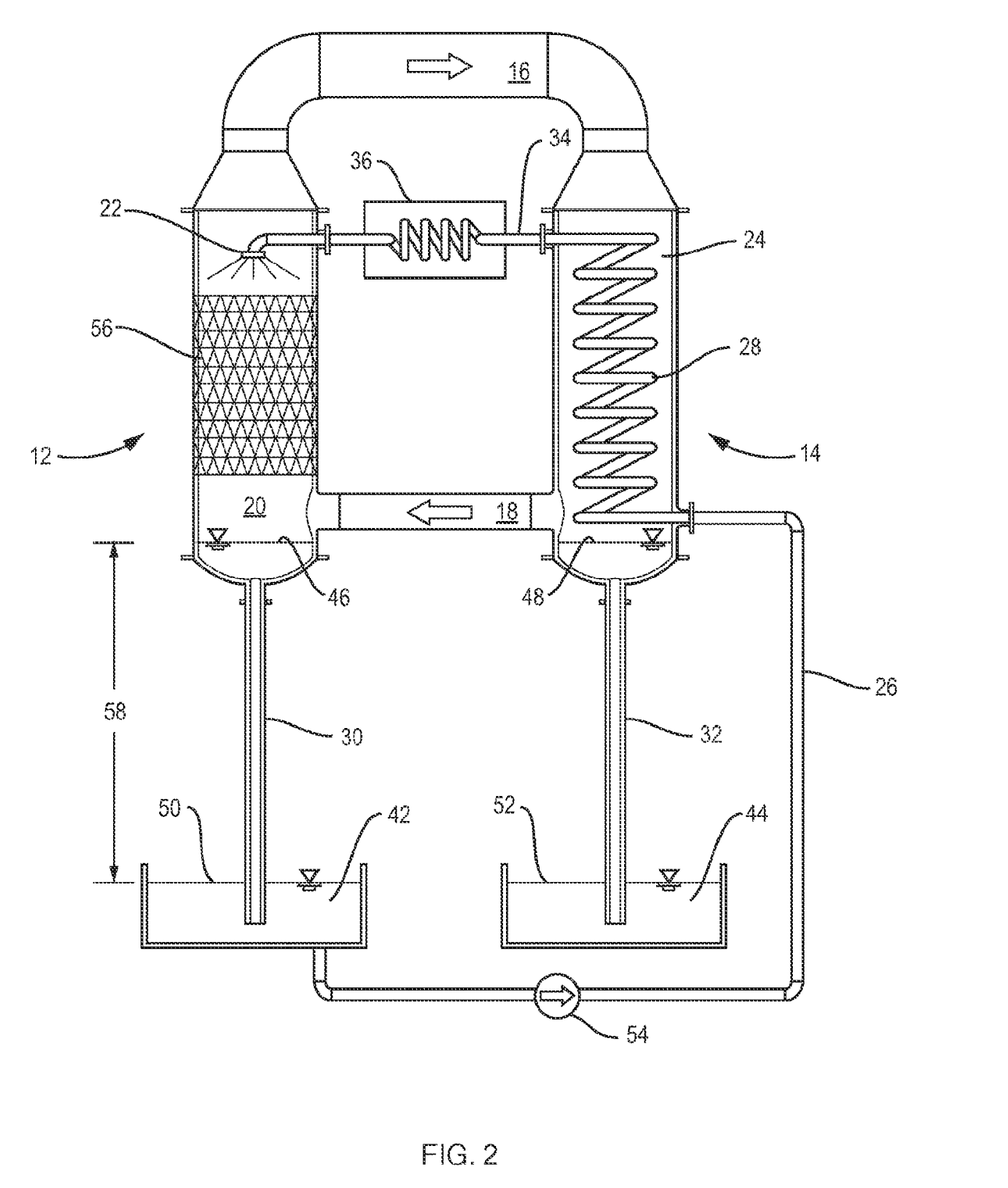
FIG. 2 is an illustration of a humidification-dehumidification cycle and apparatus that utilizes liquid mixture heating.
Figure 3:
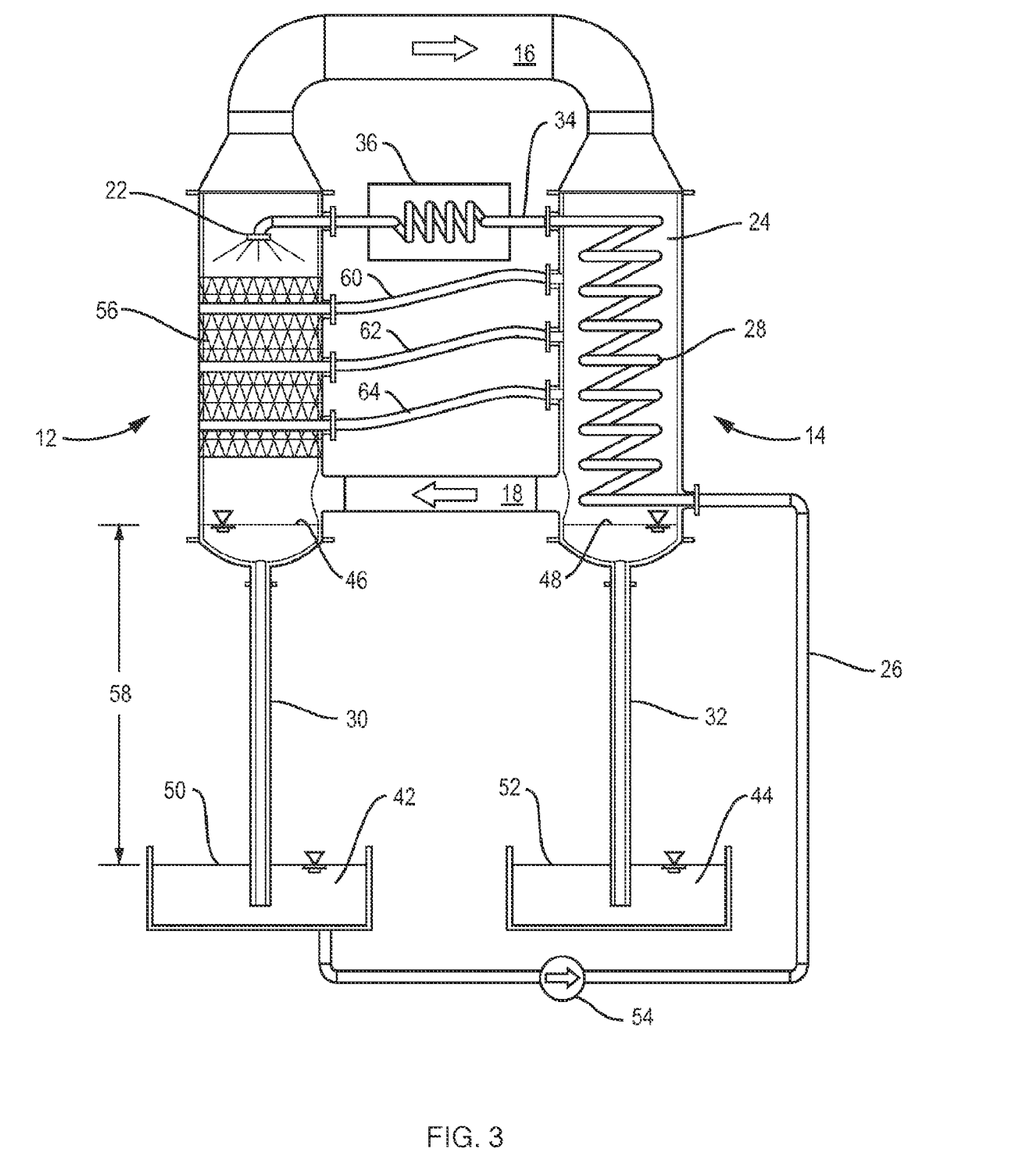
FIG. 3 is an illustration of a multi-extraction humidification-dehumidification cycle and apparatus that utilizes liquid mixture heating.
Figure 4:
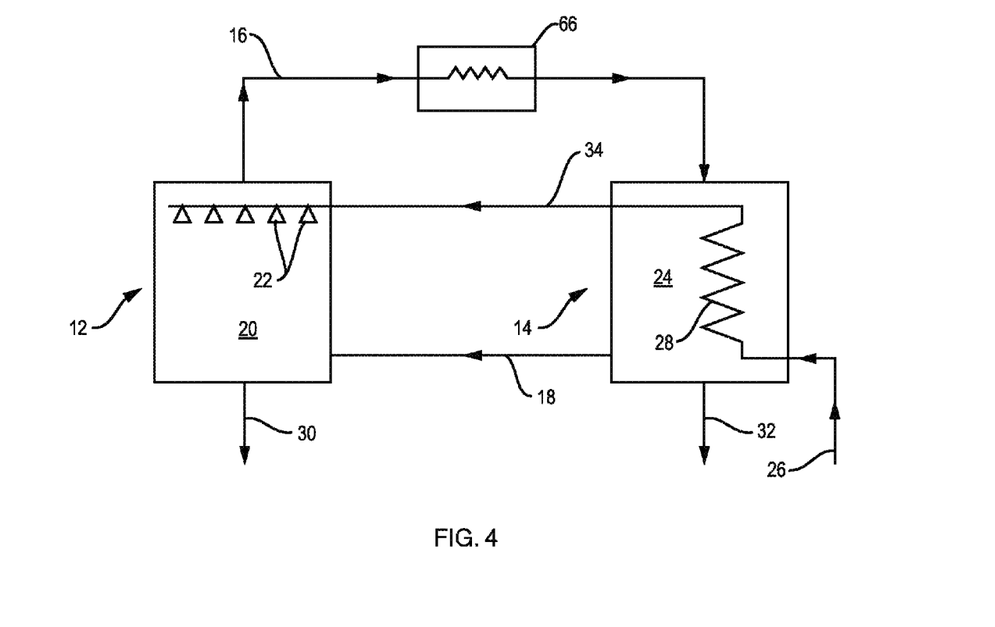
FIG. 4 is a schematic illustration of a humidification-dehumidification cycle and apparatus that utilizes carrier gas heating.
Figure 5:
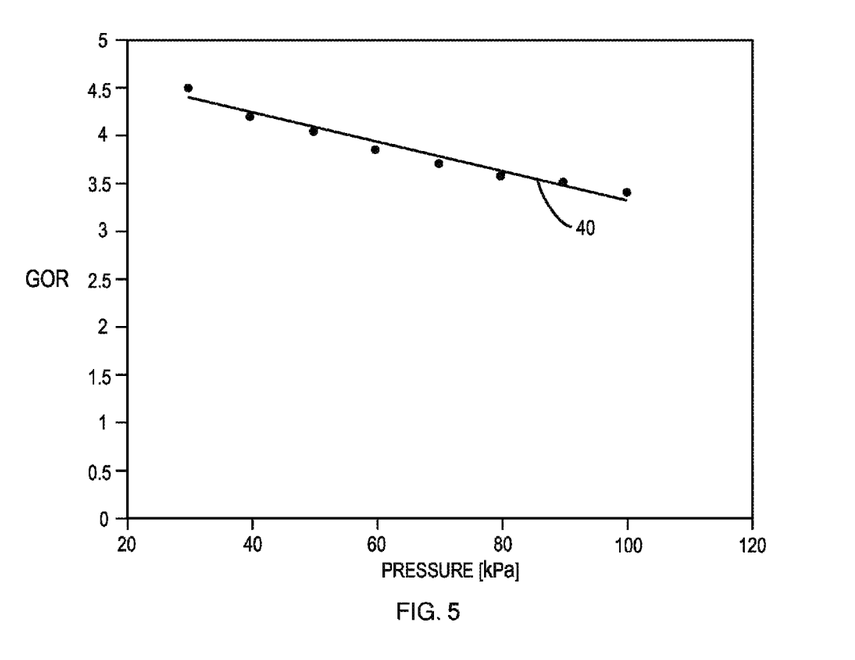
FIG. 5 is a plot showing the effect of atmospheric pressure on the performance (gained output ratio) for one embodiment of a humidification-dehumidification cycle that utilizes carrier gas heating.
Figure 6:
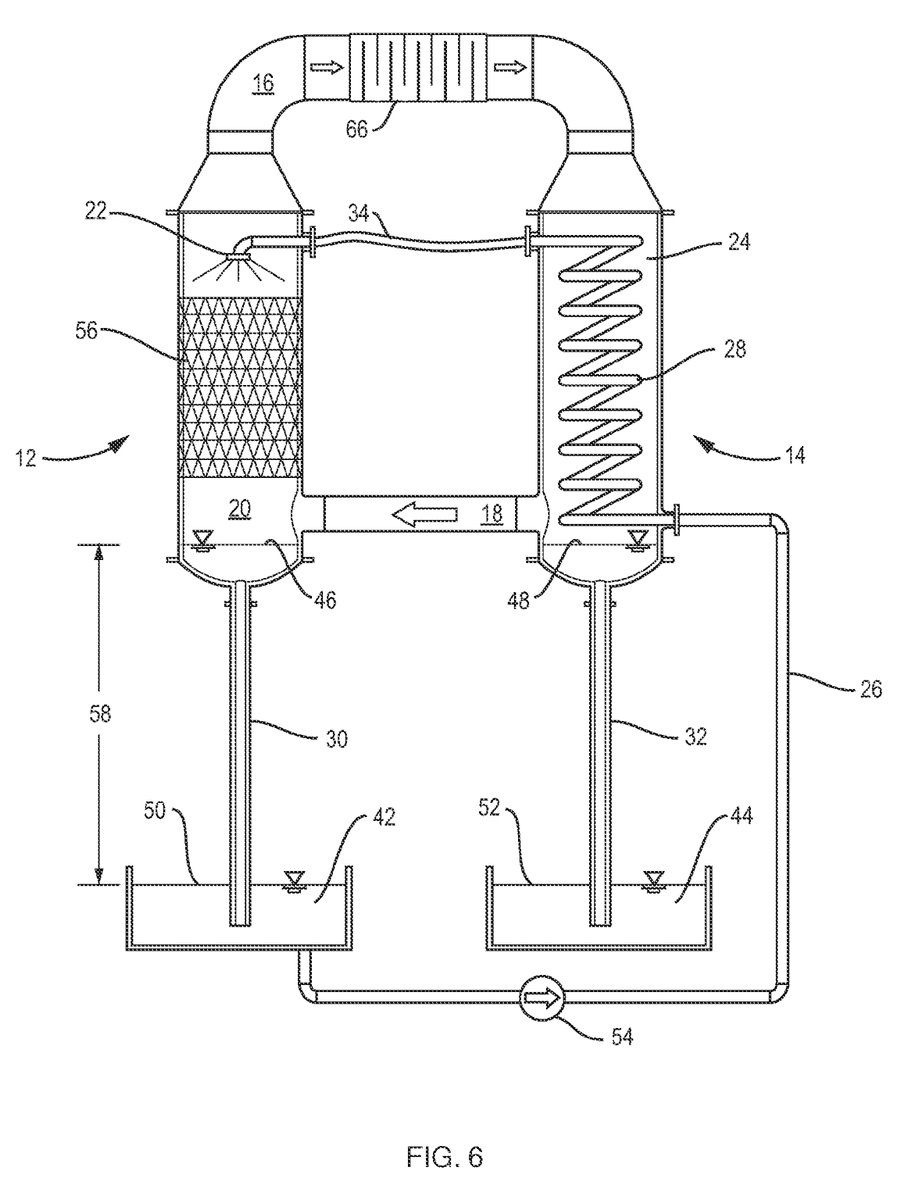
FIG. 6 is an illustration of a humidification-dehumidification cycle and apparatus that utilizes carrier gas heating.
Figure 7:
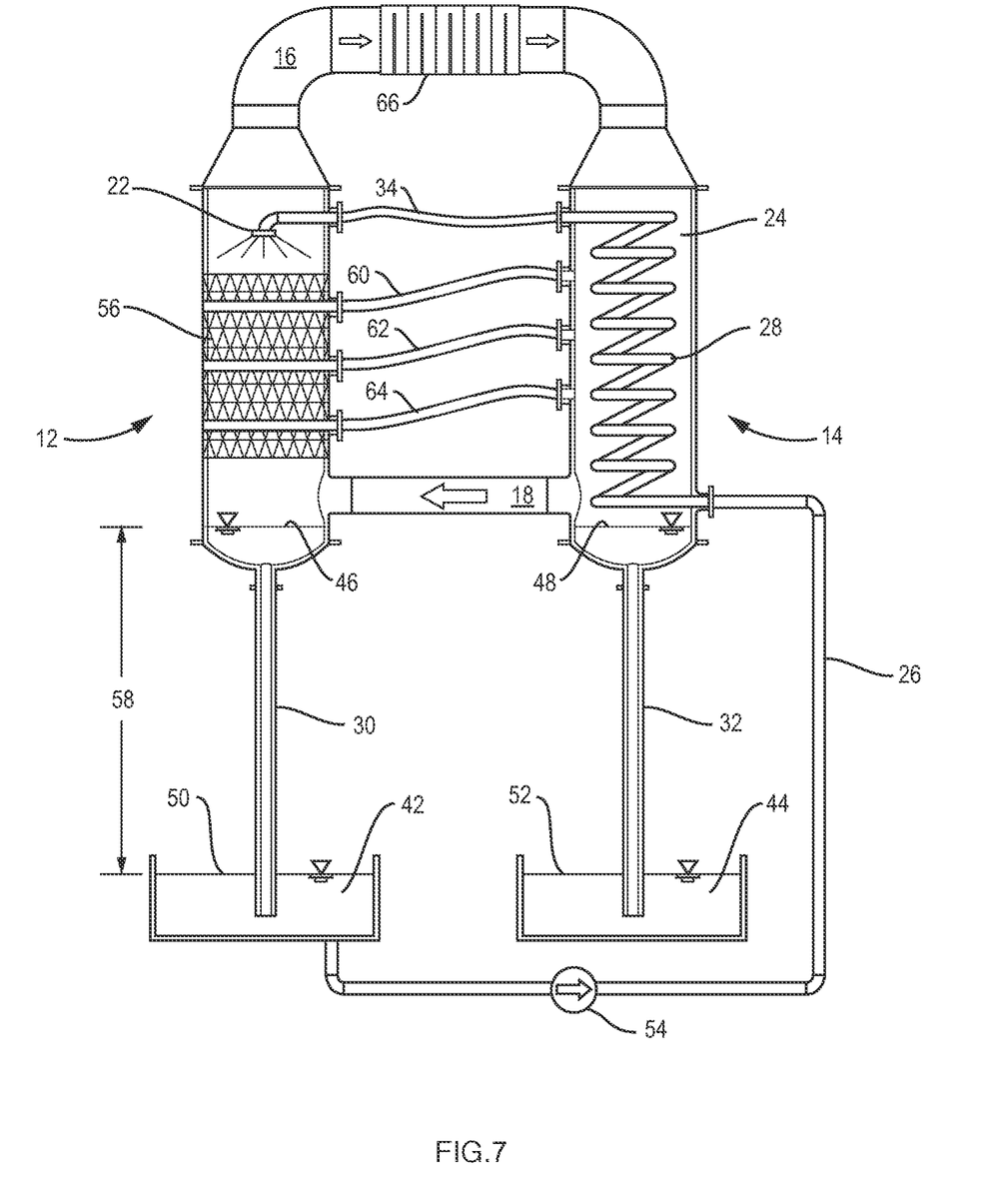
FIG. 7 is an illustration of a multi-extraction humidification-dehumidification cycle and apparatus that utilizes carrier gas heating.

A practical and simple solution for the system to be working under lower atmospheric pressure without any significant additional energy input is illustrated in FIG. 2, where a static head is fixed between the cycle equipment (including the humidifier 12 and the dehumidifier 14) and the liquid-mixture tank 42 and the pure-water tank 44. The distance 58 between the liquid/water levels 46 and 48 in the humidifier 12 and dehumidifier 14, respectively, to the liquid/water levels 50 and 52 at the tanks' surface can be, for example, between 15 feet (4.6 meters) and 20 feet (6.1 meters) to produce a Torricellian vacuum inside the chambers 20 and 24. Increasing the distance from 15 feet to 20 feet will reduce the pressure inside the cycle from 50 kPa to 40 kPa. The sub-ambient-atmospheric pressure in both the humidification chamber 20 and dehumidification chamber 24 can be substantially the same and can be, for example, at least 10% less than ambient atmospheric pressure, e.g., 90 kPa or less; or, in particular embodiments, 70 kPa or less; or, in more-particular embodiments, between 10 and 60 kPa.

As shown in FIG. 2, the humidification chamber 20 can be filled with a packing material 56 in the form, e.g., of polyvinyl chloride (PVC) packing to facilitate turbulent gas flow and enhanced direct contact between the carrier gas and the liquid mixture. The body of the humidifier (and the dehumidifier) can be formed, e.g., of stainless steel and is substantially vapor impermeable; seals formed, e.g., of epoxy sealant, gaskets, O-rings, welding or similar techniques, are provided at the vapor and water inputs and outputs of the humidifier and at the interfaces of each modular component and adjoining conduits to maintain vacuum in the system. In one embodiment, humidification chamber 20 is substantially cylindrical with a height of about 1.5 m and a radius of about 0.25 m.

As can be pictured via the image of FIG. 2, humidification of the carrier gas is achieved by spraying the liquid mixture from one or more nozzles 22 into a spray zone at the top of the humidifier 12 then through a packing material 56 and down through a rain zone to a surface 46 of collected liquid mixture at the bottom of the chamber, while the carrier gas moves up through the humidification chamber 20, as shown, and is brought into contact with the liquid mixture, particularly in the bed of packing material 56, to add water vapor from the liquid mixture to the carrier gas.

Additionally, the remaining liquid mixture in the water tank 42 can be pumped via a water pump 54, which can be powered by a photovoltaic solar panel or by a wind turbine, through conduit 26 so that it can be pumped back through the system to evaporate more water from the liquid mixture in the humidifier 12. The water tank 42 may be connected to a large body of the liquid mixture (e.g., sea, ocean, groundwater, etc.) in which the water concentration of the liquid mixture does not change with evaporation in the humidifier. Otherwise, water concentration in the tank 42 can be monitored, and blow-down and make up can be provided to keep the water concentration in tank 42 within an operating limit.

FIG. 3 shows the same humidification-dehumidification cycle that utilizes liquid mixture heating with a multi-extraction configuration, wherein the gas is extracted from a plurality of distinct intermediate locations in the humidifier 12 and fed to corresponding distinct intermediate locations in the dehumidifier 14 via gas conduits 60, 62 and 64, allowing for manipulation of gas mass flows, thermal balancing of equipment and for a higher recovery of heat. Alternatively, gas can flow in the opposite direction through conduits 60, 62 and 64 from the dehumidifier 14 to the humidifier. The gas can flow through the conduits 60, 62 and 64 naturally, or the flow can be powered by a fan in one or more of the conduits. The amount of extracted gas depends strongly on the operating conditions, and this amount can be controlled via variable speed fans (if fans are used) or by adjusting the extraction conduit size (i.e., diameter and/or length).

Instead of directly heating the liquid mixture, as shown in FIGS. 1, 2 and 3, the circulated carrier gas can be heated by a gas heater 66 in gas conduit 16 after the carrier gas passes through the humidifier 12, as shown in the gas-heated humidification-dehumidification cycle of FIG. 4. The gas heater 66 can be, e.g., a solar air heater. Heating the humidified carrier gas in turns heats the liquid mixture in the dehumidification chamber 24. The performance of this cycle, measured as gained output ratio (GOR) for one exemplary embodiment of the apparatus and method, is shown in FIG. 5 for an embodiment with an inlet feed water temperature of 30° C., a heated air temperature of 67° C., and a humidifier and dehumidifier effectiveness of 90%. As shown in FIG. 5, The GOR in this embodiment ranges from about 3.5 at ambient atmospheric pressure to about 4 at about 50 kPa and then to about 4.5 at 30 kPa (which is a 28.5% increase in GOR). A detailed drawing of the gas-heated cycle is shown in FIG. 6, while a detailed drawing of the multi-extracted configuration of the gas-heated cycle is shown in FIG. 7, where the gas is extracted from multiple intermediate locations in the dehumidification chamber 24 to be fed to corresponding intermediate locations in the humidification chamber 20, through conduits 60, 62 and 64 allowing for equipment thermal balancing and a higher recovery of heat. Providing the multi-extracted configuration for the gas heated cycle (FIG. 7) can increase the GOR to higher values. Again, the gas may flow in either direction through conduits 60, 62 and 64.

In describing embodiments of the invention, specific terminology is used for the sake of clarity. For purposes of description, each specific term is intended to at least include all technical and functional equivalents that operate in a similar manner to accomplish a similar result. Additionally, in some instances where a particular embodiment of the invention includes a plurality of system elements or method steps, those elements or steps may be replaced with a single element or step; likewise, in some instances, a single element or step may be replaced with a plurality of elements or steps that serve the same purpose. Further, where parameters for various properties are specified herein for embodiments of the invention, those parameters can be adjusted up or down by $1/100^{th}$, $1/50^{th}$, $1/20^{th}$, $1/10^{th}$, $1/5^{th}$, $1/3^{rd}$, $1/2$, $3/4^{th}$, etc. (or up by a factor of 2, 5, 10, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of all references, including reference texts, journal articles, patents, patent applications, etc., cited throughout the text are hereby incorporated by reference in their entirety. Appropriate components and methods of those references may be selected for the invention and embodiments thereof. Still further, the components and methods identified in the Background section can be used in conjunction with or substituted for components and methods described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for increasing the productivity of a combined heat and mass transfer device, the method comprising:

directing a flow of a carrier-gas mixture through a fluid flow path in a combined heat and mass transfer device, the device operating at a pressure below atmospheric pressure; and transferring heat and mass from or to the carrier-gas mixture by a direct or indirect interaction with a liquid composition that includes a vaporizable component in a liquid state to substantially change the content of the vaporizable component in the carrier-gas mixture via evaporation of the vaporizable component from the liquid composition or via condensation of the vaporizable component from the carrier-gas mixture, producing a flow of carrier-gas mixture having a concentration of the vaporizable component that differs from the concentration of the vaporizable component in the carrier-gas mixture before the heat and mass transfer process.

2. The method of claim 1, wherein the combined heat and mass transfer device is a packed bed humidification device, wherein the vaporizable component includes water, and wherein the heat and mass transfer includes vaporization of liquid water from the liquid composition to a vapor form in the carrier-gas mixture.

3. A method for substantially separating water from a liquid mixture including water, the method comprising:

directing a flow of a carrier gas through a humidification chamber in at least one humidifier;

heating a liquid mixture including liquid water and at least one other ingredient selected from dissolved components, solids and other liquids;

spraying the heated liquid mixture over packing material in the humidification chamber where the heated liquid mixture directly contacts the flow of carrier gas to humidify the carrier gas with water evaporated from the liquid mixture, producing a humidified gas flow, wherein the total pressure in the humidification chamber is less than ambient atmospheric pressure;

directing the humidified gas flow through a dehumidification chamber in at least one dehumidifier;

dehumidifying the humidified gas flow in the dehumidification chamber to condense water from the humidified gas flow, wherein the total pressure in the dehumidification chamber is less than the ambient atmospheric pressure; and collecting the condensed water.

4. The method of claim 3, further comprising collecting the non-evaporated content of the liquid mixture in a bottom portion of the humidification chamber as water is evaporated from the liquid mixture, wherein the water released in the dehumidification chamber is collected in a bottom portion of the dehumidification chamber.

5. The method of claim 3, wherein the carrier gas is directed through the humidifier and the dehumidifier in a closed loop.

6. The method of claim 3, further comprising heating the liquid mixture before it enters the humidification chamber.

7. The method of claim 6, wherein the liquid mixture is heated via solar energy, waste heat, or fossil fuel.

8. The method of claim 3, wherein the gas flow is extracted from at least one intermediate location in the humidification chamber or in the dehumidification chamber and fed from each extracted intermediate location to a corresponding intermediate location in the dehumidification chamber or in the humidification chamber, respectively, allowing for manipulation of gas mass flows and for greater heat recovery.

9. The method of claim 3, further comprising heating the humidified gas flow before it enters the dehumidification chamber.

10. The method of claim 9, wherein the humidified gas flow is heated via solar energy, waste heat, or fossil fuel.

11. The method of claim 3, wherein the pressure in the humidification chamber and in the dehumidification chamber is 90 kPa or less.

12. The method of claim 3, wherein the pressure in the humidification chamber and in the dehumidification chamber is 70 kPa or less.

13. The method of claim 3, wherein the pressure in the humidification chamber and in the dehumidification chamber is between 10 and 60 kPa.

14. The method of claim 3, further comprising circulating the carrier gas through the humidification chamber and through the dehumidification chamber naturally or by a fan powered by an energy source selected from at least one of the following: solar energy and wind energy.

15. The method of claim 3, further comprising circulating the liquid mixture through the humidifier and through the dehumidifier by a pump powered by an energy source selected from at least one of the following: solar energy and wind energy.

16. The method of claim 3, wherein the apparatus is operated free of any electrical coupling with an electrical power grid.

17. The method of claim 3, wherein the liquid mixture is selected from seawater, brackish water or groundwater.

18. The method of claim 3, wherein the dehumidifier is substantially thermally separated from the humidifier in a modular construction.

19. The method of claim 3, wherein the sub-atmospheric pressure in the humidification and dehumidification chambers is generated by means consisting essentially of:

a water-filled receptacle positioned beneath the dehumidification chamber and a water-filled conduit extending from the bottom portion of the dehumidification chamber into the water-filled receptacle; and a liquid-mixture-filled receptacle positioned beneath the humidification chamber and a liquid-mixture-filled conduit extending from the bottom portion of the humidification chamber into the liquid-mixture-filled receptacle.

* * * * *